United States Patent [19]
Bülow

[11] Patent Number: 5,377,284
[45] Date of Patent: Dec. 27, 1994

[54] INTERFEROMETRIC OPTICAL SWITCH

[75] Inventor: Henning Bülow, Ludwigsburg, Germany

[73] Assignee: Alcatel Sel Aktiengesellschaft, Stuttgart, Germany

[21] Appl. No.: 147,384

[22] Filed: Nov. 3, 1993

[30] Foreign Application Priority Data

Nov. 12, 1992 [DE] Germany .............................. 4238103

[51] Int. Cl.$^5$ .............................................. G02B 6/26
[52] U.S. Cl. ...................................... 385/11; 356/351; 385/16; 385/27
[58] Field of Search ............... 356/345, 349, 350, 351; 385/1-9, 15, 16, 27, 39, 42, 122, 11

[56] References Cited

U.S. PATENT DOCUMENTS

| | | | |
|---|---|---|---|
| 4,995,690 | 2/1991 | Islam | 385/8 |
| 5,044,715 | 9/1991 | Kawachi et al. | 385/42 |
| 5,144,375 | 9/1992 | Gabriel et al. | 356/345 |
| 5,155,779 | 10/1992 | Avramopoulos et al. | 385/122 X |
| 5,208,705 | 5/1993 | Avramopoulos et al. | 385/16 X |

FOREIGN PATENT DOCUMENTS

9209916 6/1992 WIPO .

OTHER PUBLICATIONS

"Demonstration of the Optical Kerr Effect in an All-Fibre Mach-Zehnder Interferometer at Laser Diode Powers", I White et al, *Electronics Letters,* Mar. 17, 1988, vol. 24, No. 6, pp. 340-341.

"All-Optical Gbit/s Switching Using Nonliner Optical Loop Mirror", B. Nelson et al, *Electronics Letters,* Apr. 25, 1991, vol. 27, No. 9, pp. 704-705.

"Depolarized Source for Fiber-Optic Applications", W. Burns et al, *Optics Letters,* Mar. 15, 1991, vol. 16, No. 6, pp. 381-383.

"Polarization-Independent All-Optical Switching" by N. A. Whitaker, et al, IEEE Photonics Technology Letters 4 (1992) Mar., No. 3, New York, pp. 260-263.

"Ultrafast Polarisation-Independent Optical Demultiplexer Using Optical Carrier Frequency Shift Through Crossphase Modulation" by T. Morioka, et al, *Electronics Letters,* May 21, 1992, vol. 28, No. 11, pp. 1070-1072.

"Ultrafast Polarisation-Independent All-Optical Switching Using a Polarisation Diversity Scheme in the Nonlinear Optical Loop Mirror" by K. Uchiyama, et al, *Electronics Letters,* Sep. 24, 1992, vol. 28, No. 20, pp. 1864-1866.

"Polarisation-Independent Switching in a Nonlinear Optical Loop Mirror by a Dual-Wavelength Switching Pulse," by H. Bulow, et al, *Electronics Letters,* Apr. 1, 1993, vol. 29, No. 7, pp. 588-589.

*Primary Examiner*—John D. Lee
*Attorney, Agent, or Firm*—Ware, Fressola, Van Der Sluys & Adolphson

[57] ABSTRACT

For so-called add-drop multiplexers, fast optical switches (SCH) are needed which can switch optical signal waves stemming from different signal sources. Known optical switches include an interferometer in which the signal wave is split into two signals, and in which an optical switching pulse is superimposed on one of the signals. Because of the Kerr effect, interference signals can be generated which can be switched in an optical coupler in a controllable manner to a predetermined output. The signals and the switching pulse have the same direction of polarization, which may cause switching problems with signals from different signal sources. The gist of the invention therefore lies in the use of switching pulses which consist of quasi-depolarized light. Such switching pulses are advantageously generated in two switching-pulse sources (SQ) in which two polarized light beams are superimposed orthogonally. In an optical waveguide (LWL$_1$, SP) with a nonlinear refractive index, the switching pulse assumes a constantly varying polarization state.

13 Claims, 3 Drawing Sheets

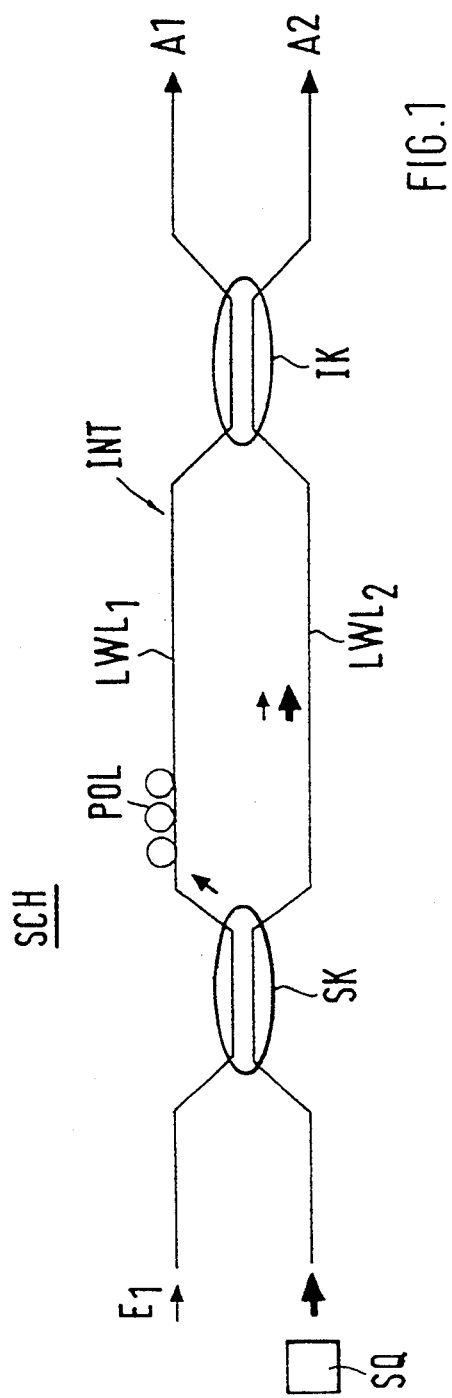
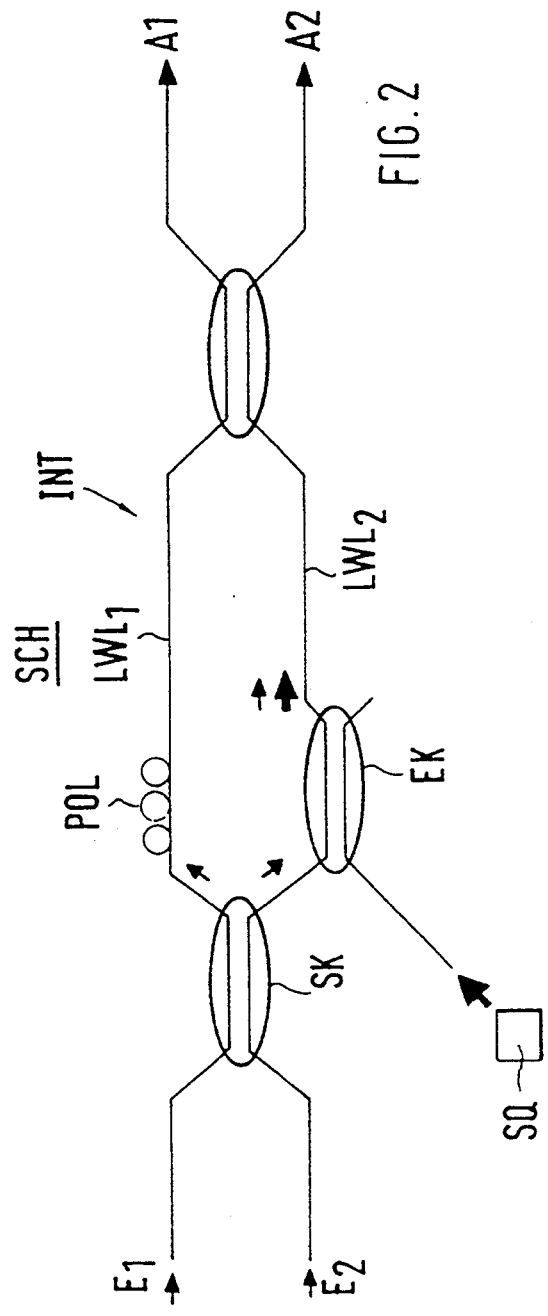

INTERFEROMETRIC OPTICAL SWITCH

TECHNICAL FIELD

The present invention relates to optical signals, and more particularly, to an optical switch therefor.

BACKGROUND OF THE INVENTION

Known optical switches are designed to rapidly switch optical signals, e.g., in so-called add-drop multiplexers. These add-drop multiplexers are parts of digital transmission systems which operate according to the synchronous digital hierachy (SDH) and in which additional signals are inserted into or branched from a frame-structured time-division multiplex signal.

Such a switch is known from the journal "Electronics Letters", 17th March 1988, Vol. 24, No. 6, pages 340-341 . It comprises a Mach-Zehnder interferometer with two arms. An optical signal is coupled through a first coupler into both arms and is then recombined in a second coupler. An optical switching pulse can be applied to one of the two arms, so that as a result of the Kerr effect, a controlled change in the optical length of this arm occurs for light of a yen direction of polarization. This change causes a phase shift of the two signals. By interference influenced by a controlled phase shift, the optical signal wave in the second coupler is switched. From the journal "Electronics Letters", Apr. 25, 1991, Vol. 27, No. 9, pages 704-705, another optical switch is known which is designed as an interferometer and in which an optical signal wave can be switched by an optical switching pulse. The interferometer used was a so-called Sagnac interferometer.

In both known types of optical switches, a polarized optical signal wave is switched. To obtain a defined interaction between the optical signal wave and the optical switching pulse, the known interferometers include polarization controllers, which, if operated for prolonged periods of time, have to be readjusted due to temperature variations and other influences.

Furthermore, the signal waves frequently come from different signal sources and have different directions of polarization. In that case, too, constant readjustment of the polarization controllers is necessary to permit optimum switching.

DISCLOSURE OF INVENTION

It is an object of the present invention to provide an optical switch which permits reliable, definable switching by simple means even over prolonged periods of time.

According to the present invention, an optical switch having at least one signal input and at least one signal output and having an interferometer interposed between the signal input or inputs and the signal output or outputs and wherein an optical signal wave, preferably polarized in one direction, is split into the interferometer into two optical signals which propagate differently in the interferometer and are reunited in an optical coupler, one output of the coupler providing a signal dependent on the relative phase of the two optical signals, and wherein only, or preferably, one of the two optical signals is caused by an optical switching pulse to travel a longer optical path, and wherein the optical switching pulse is depolarized or has many distributed states of polarization over one switching period.

In further accord with the present invention, the optical switching pulse has many distributed states of polarization over one switching period and comprises two light beams of approximately equal intensity, approximately equal wavelength, and short coherent length, which are linearly polarized in mutually orthogonal directions, and wherein the switching pulse propagates at least partly together with one of the optical signals in an optical waveguide of the interferometer having a nonlinear refractive index. The switching-pulse source for generating the optical switching pulse may have two light sources. The switching-pulse sources may emit light of narrow spectral bandwidth and differing mean wavelengths. Furthermore, the switching-pulse source for generating the optical switching pulse may include a light source whose output is divided in a branching element into two parts, one of which is delayed, and wherein the two parts are reunited in a polarization-sensitive combiner. Moreover, since the superposition of the two light beams results in a beat, the length of the waveguide having the nonlinear refractive index may be greater than or approximately equal to the beat wavelength.

In further accord with the present invention, the optical switching pulse is depolarized, and the switching-pulse source is a gas laser.

According further to the present invention, the interferometer is a Mach-Zender interferometer with two interferometer arms and wherein the optical signal wave propagates in both interferometer waves in the same direction and the switching pulse propagates predominantly in only one of the interferometer arms.

In still further accord with the present invention, for at least one of the optical signals, means (POL) are provided for adjusting the state of polarization of the signal wave.

In accordance still further with the present invention, the nonlinear optical fiber is a polarization-maintaining fiber.

According further to the present invention, the interferometer is a SAGNAC interferometer and comprises a fiber coil in which the two signals propagate in opposite directions and in which the switching pulse propagates predominantly in only one direction.

In accordance still further with the present invention, the optical switching pulse is coupled into the interferometer separately from the signal wave. The optical switching pulse may be coupled into the interferometer through a fused fiber coupler.

These and other objects, features and advantages of the present invention will become more apparent in light of the detailed description of a best mode embodiment thereof, as illustrated in the accompanying drawing.

BRIEF DESCRIPTION OF THE DRAWING

FIG. 1 shows a first embodiment of an optical switch with a Mach-Zehnder interferometer;

FIG. 2 shows a second embodiment of an optical switch with a Mach-Zehnder interferometer in which optical switching pulses are coupled directly into one arm of the interferometer;

BEST MODE FOR CARRYING OUT THE INVENTION

Figure 3:
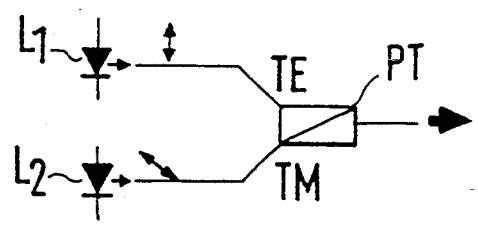
FIG. 3 shows a first embodiment of a switching-pulse source.

The physical principle on which the operation of the novel optical switch is based is the so-called Kerr effect. The Kerr effect causes an optical signal wave in optical waveguides to see a different refractive index as a result of the injection of an optical switching pulse. The Kerr effect is maximized if the signal wave and the switching pulse have equal polarization states, and exhibits a low value if the polarization directions of the signal wave and the switching pulse are orthogonal to each other. In this manner, the propagation of the optical signal wave is influenced.

The high speed of the Kerr effect makes it possible to build fiber-optic switches as are known, for example, from the journal "Electronics Letters", Mar. 17, 1988, Vol. 24, No. 6, pp. 340–341, and from the issue of Apr. 25, 1991, Vol. 27, No. 9, pp. 704–705, which are capable of switching data sequences at a bit rate of several gigabits per second.

Both the prior art optical switches and the optical switches according to the invention are based on the interferometer principle. FIG. 1 shows a first embodiment of an optical switch SCH according to the invention that includes a Mach-Zehnder interferometer INT which includes two optical couplers (SK, IK) and two glass fibers as interferometer arms $LWL_1$, $LWL_2$ and has an input $E_1$ and two outputs. The couplers SK, IK are so-called 2×2 couplers, i.e., they each have two inputs and two outputs. The first input of the first coupler SK represents the signal input $E_1$ of the optical switch, which can be switched to one of the outputs $A_1$, $A_2$. Through the second input of the first coupler SK, the optical switching pulse is fed into the interferometer INT. The carrier wavelength of the optical signal wave and that of the switching pulse differ in such a way that the wavelength-dependent first coupler SK divides the signal wave equally into two signals, henceforth called "component signals", and couples these signals to its two outputs and, thus, to the two arms $LWL_1$, $LWL_2$, whereas the switching pulse is coupled predominantly into one arm $LWL_2$. On the side remote from the first coupler SK, the two arms $LWL_1$ and $LWL_2$ are connected to the two inputs of the second optical coupler IK. In the second coupler IK, the two component signals thus interfere positively.

For this case, the second coupler IK is designed to couple the entire interference signal to one of its outputs, here the output $A_1$. If the two component signals undergo different treatments in the interferometer arms, e.g., if a switching pulse is applied to the arm $LWL_2$, the interference signal formed in the second coupler IK will couple to the second output $A_2$. Due to the Kerr effect, the component signal in the second arm $LWL_2$ sees a higher refractive index, which means a longer optical path length for this component signal between the two couplers and results in a phase shift between the two component signals and, thus, if the phase shift amounts to, e.g., half a wavelength, in the interference signal being switched from the signal output $A_1$ to the signal output $A_2$.

In FIG. 1 and throughout the following figures, the signal wave is indicated by a thin arrow and the switching pulse by a heavy arrow.

Under realistic conditions, such switching of the optical signal wave does not take place completely but suffices to meet the requirements, e.g., those in an add-drop multiplexer. Sufficient interference of the two component signals in the second coupler IK occurs only if the polarizations of the two component signals are largely identical. To ensure this, the first interferometer arm $LWL_1$ is supplemented with a polarization controller POL, which is known per se.

To make better use of the Kerr effect, the polarization directions of the component signal in the second arm $LWL_2$ and the switching pulse should be identical, which led to the provision of a second polarization controller in the known optical switches.

A main part of the invention consists in the fact that it overcomes the view held by those skilled in the art that it is necessary to use unidirectionally polarized light for the component signal and the switching pulse.

The solution according to the invention uses a switching pulse which is always depolarized, it being not necessary that all polarization states should be present or that a switching pulse should have many evenly distributed polarization states over one switching period. Such a switching pulse will hereinafter be referred to as "quasi-depolarized".

The use of quasi-depolarized light as an optical switching pulse allows signals to be switched independently of their directions of polarization and without the need for any further devices. Another advantage is that even a change of the polarization state of the signal wave to be switched has no influence on the action of the switch according to the invention.

Known quasi-depolarized switching-light sources, such as pulse-controlled optical switching-pulse sources, do not generally have sufficient power in one polarization state to be used as a switching-pulse source in a single-mode fiber. Laser diodes with sufficiently high power, in turn, are strongly polarized.

To generate quasi-depolarized switching pulses with sufficiently high power as are necessary for the invention, the switching-pulse sources described in the following embodiments have proved particularly advantageous.

Figure 4:
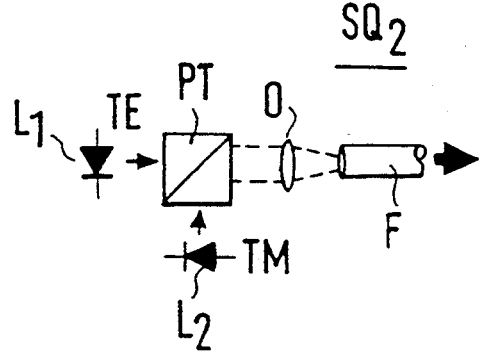
FIG. 4 shows a second embodiment of a switching-pulse source.

In the first two embodiments of switching-pulse sources $SQ_1$, $SQ_2$, shown in FIGS. 3 and 4, respectively there are two light sources $L_1$, $L_2$ which emit light in the same wavelength region and with approximately the same amplitude and whose polarization directions are orthogonal to each other. In a nonlinear, optically dispersive element, the polarization state oscillates, so that the generated light acts like depolarized light. The generation of depolarized light using two light sources which emit polarized light is known from the journal "OPTICS LETTERS" Vol. 16, No. 6, Mar. 15, 1991, pp. 381 to 383.

In the first embodiment, shown in FIG. 3, the two light sources $L_1$, $L_2$ generate practically incoherent light beams of great spectral width which are concentrated onto a fiber by a polarization combiner PT. The light sources $L_1$, $L_2$ are longitudinally multipolar laser diodes, for example. The switching-pulse source $SQ_1$ may be constructed from fiber-optic components, as shown in FIG. 3. In that case, the laser diodes are spliced to a fiber-optic polarization combiner PT via a fiber section.

In the second embodiment of a switching-pulse source $SQ_2$, shows in FIG. 4, the light emitted by two laser diodes $L_1$, $L_2$ is united into one beam by a polarization combiner PT. An imaging lens 0 for concentrating the light onto a glass fiber F is positioned in the beam path between the polarization combiner PT and a glass fiber F, into which the light is to be coupled.

If, in the first two embodiments of switching-pulse sources $SQ_1$, $SQ_2$, monochromatic light sources, such as lasers with a small number of modes (solid-state lasers, particularly DFB or DBR lasers, or gas lasers), are used instead of light sources of great spectral width, the resulting light is not always depolarized, but its polarization state oscillates at a very high frequency, e.g., at $f=130$ GHz, at wavelengths of 1531 nm and 1532 nm. To average the likewise oscillating phase modulation of the switching pulse with the signal wave, it is therefore necessary to lead at least approximately one beat wave length of the two switching-pulse wavelengths past each other. For the above-represented wavelength spacing of 1 nm, for example, a beat wavelength of 1.6 mm is obtained. At typical values for the wavelength spacing between signal wave and switching pulse of 20 nm and a fiber dispersion of 50 ps/km, signal wave and switching pulse will move past each other every 200 m by the beat wavelength of 1.6 mm. The longer the interferometer arms for giving switching parameters, the more uniquely the switching states will be definable; the shorter the interferometer arms, the longer the longest possible switching time.

Figure 5:
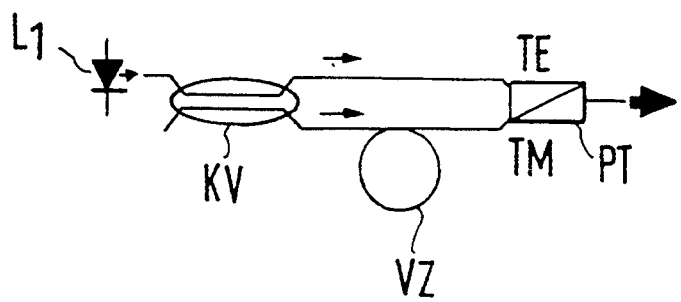
FIG. 5 shows a third embodiment of a switching-pulse source.

In a third embodiment of a switching-pulse source $SQ_3$, shown in FIG. 5, the emitted light comes from only one laser diode $L_1$ and is divided into equal parts in a fiber coupler KV. One of the two parts passes through a delay fiber VZ, and the two parts are reunited in a polarization combiner PT. The time delay $\Delta T$ introduced by the delay fiber must be chosen to be longer than the coherence time of the emitted light.

The third embodiment of a switching-pulse source $SQ_3$ is particularly suited for generating pulse sequences, since only one laser diode $L_1$ must be driven. To generate a pulse sequence of period T, it is necessary to pulse the laser diode $L_1$ and to adapt the period to the delay section VZ in such a way that the propagation time of the pulses through the delay section VZ is an integral multiple of the period. The laser diode may have a narrow spectral width, since the switching pulses, which are emitted at different instants of time, have a low degree of coherence to other single switching pulses and to the combined switching pulses and are thus depolarized in any case.

FIG. 2 shows a second embodiment of an optical switch SCH with a Mach-Zehnder interferometer, which differs from the first embodiment in the way the switching pulses are coupled into the interferometer. In the second embodiment, the switching pulses are coupled directly into one of the interferometer arms through a third coupler EK, which is specifically provided for this purpose. Otherwise the two embodiments are identical. In the following, therefore, only the aspects relevant to this difference are described. To inject the switching pulse, use is advantageously made of a fused fiber coupler EK, which is inexpensive and introduces only little attenuation. Other types of optical couplers are also usable. As the signal wave and the switching pulse are injected separately, less stringent requirements are placed on the first coupler SK, since only the 1:1 distribution of the signal wave to the two arms $LWL_1$, $LWL_2$ must be taken into account. This also allows the use of signal waves from a greater wavelength range.

Another advantage of the second embodiment is that a second input $E_2$ is available for switching an additional signal wave. The two signal waves can be switched parallel to each other or crosswise.

A switching pulse for the first two embodiments of optical switches may also represent a continuous pulse, so that a switching state continues over a longer period.

Figure 6:
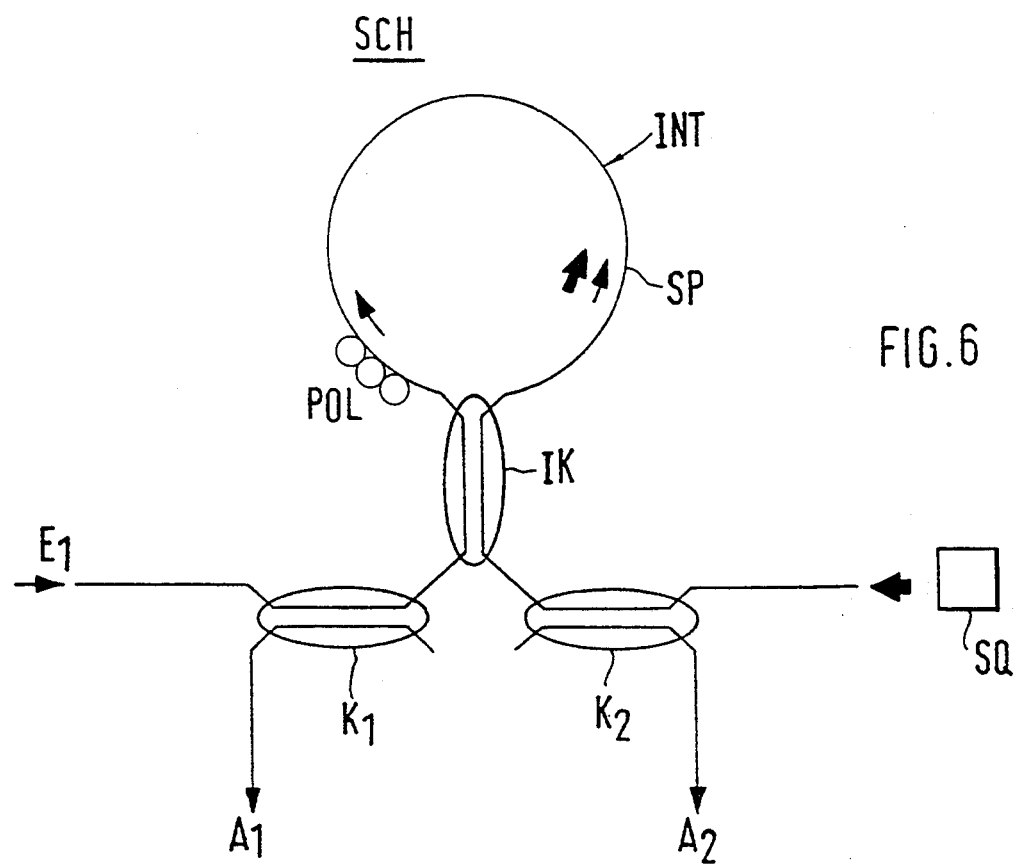
FIG. 6 shows a third embodiment of an optical switch with a Sagnac interferometer.

A third embodiment of an optical switch SCH is depicted in FIG. 6. The optical switch has one input $E_1$ and two outputs $A_1$, $A_2$ which are connected via optical $2\times 2$ couplers $K_1$, $K_2$ to an interferometer INT. The interferometer is a known type for measuring rotation rates using the Sagnac effect and, therefore, will hereinafter be referred to as a "Sagnac interferometer". The Sagnac interferometer consists of an optical $2\times 2$ coupler IK having its two outputs connected to a fiber coil SP. The coupler IK is so designed that a signal wave entering through one of its inputs propagates through the fiber coil SP in both directions. Unlike the Mach-Zehnder interferometer, the Sagnac interferometer has no separate arms. By symmetrically coupling the signal wave into the fiber coil SP in both directions, however, the same effect as in the Mach-Zehnder interferometer is achieved. As shown in FIG. 6, the two inputs of the interferometer coupler IK are connected to one port of the first coupler $K_1$ and to one port of the second coupler $K_2$, respectively, which, in turn, are connected to the input $E_1$ and the outputs $A_1$, $A_2$ of the optical switch SCH.

For the signal wave, the couplers $K_1$, $K_2$ are advantageously designed as 1:1 couplers; for the interferometer coupler IK, they are ideally designed as such. This means for a signal wave entering through the input $E_1$ that 50% of the power can be fed through the first coupler $K_1$ into the interferometer coupler IK, where it is separated into two equal component signals which then travel around the fiber coil SP in opposite directions. With no switching pulse applied, the interference signal formed from the two component signals, because of the symmetrical design of the interferometer, is reflected back into the first coupler $K_1$ and couples to the output $A_1$.

In this embodiment, the optical switching pulse is generated in a switching-pulse source SQ and applied through the second coupler $K_2$ to the Sagnac interferometer. The couplers $K_2$ and IK are of such a wavelength-dependent design that the switching pulse is coupled predominantly into the interferometer coupler IK and couples in the latter to only one output. In the embodiment, this results in the switching pulse propagating in only one direction. After passage through the fiber coil SP, the switching pulse is filtered out via the interferometer coupler IK and the first coupler $K_1$.

As can also be seen from FIG. 6, a switching pulse (heavy arrow) and only one component signal (fine arrow) propagate in the fiber coil SP in the same direction, namely counterclockwise. Because of the Kerr effect, part of the signal wave, the component signal which propagates through the fiber coil together with the switching pulse, sees a change in optical path length and, consequently, a relative phase change. The interference of the two component signals in the interference coupler IK causes this interference signal to be switched to the second coupler $K_2$ and, thus, to the output $A_2$.

Figure 7:
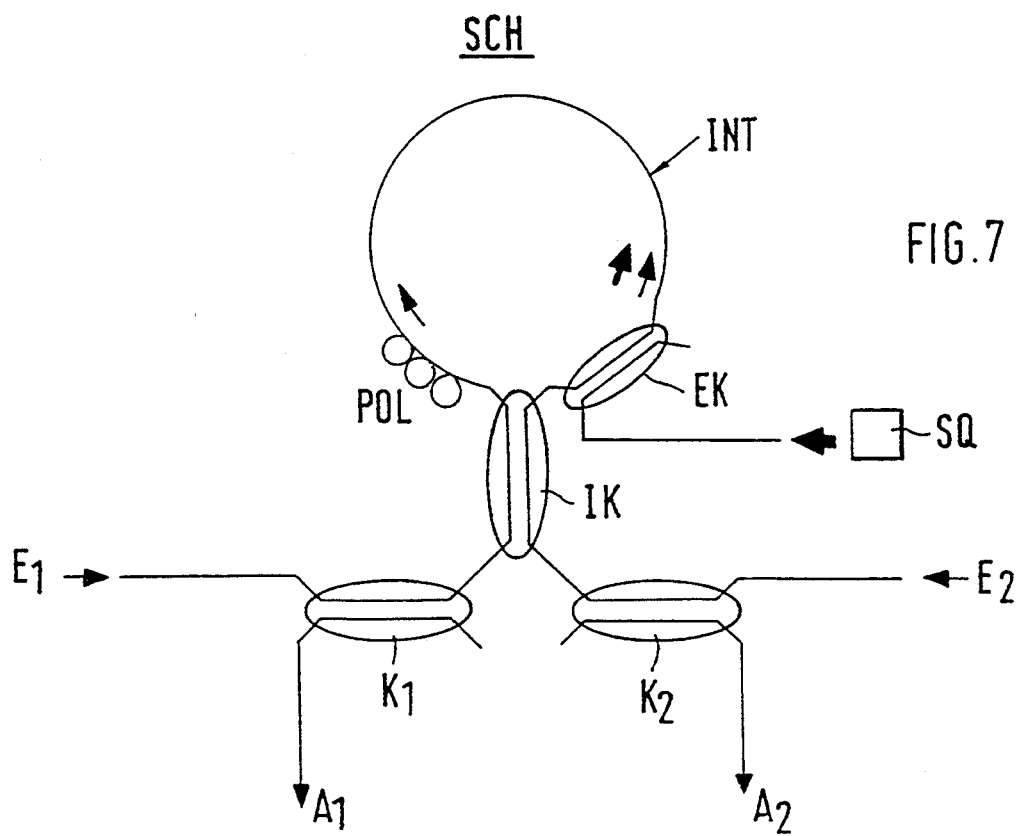
FIG. 7 shows a fourth embodiment of an optical switch with a Sagnac interferometer in which optical switching pulses are coupled directly into the fiber coil.

In a fourth embodiment, shown in FIG. 7, in a similar manner as in the second embodiment, the switching pulse is applied to the interferometer INT independently of the injection of the signal wave. To this end, the switching-pulse source is connected directly to the fiber coil by a coupler EK, preferably a fiber coupler. This offers the same advantages as those already described in connection with the second embodiment.

The length of the interferometer arms or of the fiber coil SP depends mainly on the power level of the switching pulse. At a pulse power of P=80 mW in the fiber coil SP or in the interferometer arms $LWL_1$, $LWL_2$, the coil or the arms advantageously have a length in the range of 10 to 15 km. Use can be made of commercially available dispersion-shifted optical fibers.

Besides the elements described, optical amplifiers (not shown) may be used at the inputs and outputs as well as at the feed fibers for the optical switching pulses, provided that signal wave and/or switching pulse fall into their amplification band. Through the optical amplifier, the switching-pulse power can be increased or signal losses compensated for. At the outputs, optical filters may be provided which suppress the switching pulses in relation to the signal wave.

In the third embodiment of the optical switch SCH, an optical amplifier will advantageously be inserted between the first coupler $K_1$ and the interference coupler IK, and in the fourth embodiment, an additional optical amplifier will advantageously be provided between the second coupler $K_2$ and the interference coupler IK. Such an arrangement results in the signal wave being amplified twice by only one optical amplifier.

It is also possible to provide polarization-maintaining fibers for the interferometer arms or the fiber coil SP in order to achieve defined states, which is particularly advantageous if signal waves are to be switched through which stem from different signal sources and thus may have different directions of polarization. If polarization-maintaining fibers are used instead of polarization controllers in conjunction with non-polarization-maintaining fibers, no device for controlling the polarization direction is necessary to set the switching states.

The switches described in the embodiments each have two signal outputs. The invention is also applicable to simple on-off switches. The construction can then be correspondingly simpler. In the third embodiment of an optical switch, the first coupler $K_1$, for example, could be dispensed with.

I claim:

1. An optical switch (SCH) having at least one signal input ($E_1$, $E_2$) and at least one signal output ($A_1$, $A_2$)
   wherein an interferometer (INT) is interposed between the signal input or signal inputs and the signal output or signal outputs,
   wherein an optical signal wave, preferably polarized in one direction, is split in the interferometer into two optical signals which propagate differently in the interferometer (INT) and are reunited in an optical coupler (IK) one output of which provides a signal dependent on the relative phase of the two optical signals, and
   wherein only or preferably one of the two optical signals is caused by an optical switching pulse to travel a longer optical path,
   wherein the optical switching pulse is depolarized or has many distributed states of polarization over one switching period.

2. An optical switch as claimed in claim 1, wherein the optical switching pulse has many distributed states of polarization over one switching period and comprises two light beams of approximately equal intensity, approximately equal wavelength, and short coherence length which are linearly polarized in mutually orthogonal directions, and wherein the switching pulse propagates at least partly together with one of the optical signals in an optical waveguide ($LWL_1$, SP) of the interferometer (INT) having a non-linear refractive index.

3. An optical switch as claimed in claim 2, wherein the switching-pulse source ($SQ_1$, $SQ_2$, $SQ_3$) for generating the optical switching pulse has two light sources ($L_1$, $L_2$).

4. An optical switch as claimed in claim 3, wherein the switching-pulse sources ($SQ_1$, $SQ_2$, $SQ_3$) emit light of narrow spectral bandwidth and differing mean wavelengths.

5. An optical switch as claimed in claim 2, wherein the switching-pulse source ($SQ_1$, $SQ_2$, $SQ_3$) for generating the optical switching pulse includes a light source ($L_1$) whose output is divided in a branching element (KV) into two parts one of which is delayed, and wherein the two parts are reunited in a polarization-sensitive combiner (PT).

6. An optical switch as claimed in claim 2, wherein the superimposition of the two light beams results in a beat, and wherein the length of the waveguide ($LWL_1$, SP) having the nonlinear refractive index is greater than or approximately equal to the beat wavelength.

7. An optical switch as claimed in claim 2, wherein said optical wave guide ($LWL_1$, SP) include nonlinear optical fiber which is a polarization-maintaining fiber.

8. An optical switch as claimed in claim 1, wherein the interferometer (INT) is a Mach-Zehnder interferometer with two interferometer arms ($LWL_1$, $LWL_2$), wherein the optical signal wave propagates in both interferometer arms ($LWL_1$, $LWL_2$) in the same direction, and that the switching pulse propagates predominantly in only one of the interferometer arms.

9. An optical switch as claimed in claim 1, wherein for at least one of the optical signals, means (POL) are provided for adjusting the state of polarization of the signal wave.

10. An optical switch as claimed in claim 1, wherein the optical switching pulse is depolarized, and wherein the switching-pulse source (SQ) is a gas laser.

11. An optical switch as claimed in claim 1, wherein the interferometer (INT) is a Sagnac interferometer and comprises a fiber coil (SP) in which the two signals propagate in opposite directions and in which the switching pulse propagates predominantly in only one direction.

12. An optical switch as claimed in claim 1, wherein the optical switching pulse is coupled into the interferometer (INT) separately from the signal wave.

13. An optical switch as claimed in claim 12, wherein the optical switching pulse is coupled into the interferometer (INT) through a fused fiber coupler (EK).

* * * * *

UNITED STATES PATENT AND TRADEMARK OFFICE
CERTIFICATE OF CORRECTION

PATENT NO. : 5,377,284
DATED : December 27, 1994
INVENTOR(S) : H. Bülow

It is certified that error appears in the above-indentified patent and that said Letters Patent is hereby corrected as shown below:

```
At column 8, line 38 (claim 7, line 2), please
change "include" to --includes a--.
```

Signed and Sealed this

Twenty-eight Day of March, 1995

Attest:

BRUCE LEHMAN

*Attesting Officer*     *Commissioner of Patents and Trademarks*